(12) United States Patent
Feng

(10) Patent No.: US 8,601,321 B2
(45) Date of Patent: *Dec. 3, 2013

(54) SYSTEM-ON-A-CHIP (SOC) TEST INTERFACE SECURITY

(75) Inventor: Weishi Feng, San Jose, CA (US)

(73) Assignee: Marvell World Trade Ltd., St. Michael (BB)

( * ) Notice: Subject to any disclaimer, the term of this patent is extended or adjusted under 35 U.S.C. 154(b) by 61 days.

This patent is subject to a terminal disclaimer.

(21) Appl. No.: 13/351,040

(22) Filed: Jan. 16, 2012

(65) Prior Publication Data

US 2012/0117433 A1    May 10, 2012

Related U.S. Application Data

(63) Continuation of application No. 11/654,841, filed on Jan. 18, 2007, now Pat. No. 8,099,629.

(60) Provisional application No. 60/831,022, filed on Jul. 14, 2006, provisional application No. 60/820,287, filed on Jul. 25, 2006.

(51) Int. Cl.
*G06F 11/00* (2006.01)

(52) U.S. Cl.
USPC ............................................. 714/27; 726/16

(58) Field of Classification Search
USPC .......................................................... 714/27
See application file for complete search history.

(56) References Cited

U.S. PATENT DOCUMENTS

| | | | |
|---|---|---|---|
| 6,754,784 B1 * | 6/2004 | North et al. | 711/145 |
| 7,386,713 B2 * | 6/2008 | Madter et al. | 713/2 |
| 7,509,250 B2 * | 3/2009 | Cruzado et al. | 703/28 |
| 2005/0033951 A1 * | 2/2005 | Madter et al. | 713/2 |
| 2005/0190917 A1 * | 9/2005 | Noh | 380/239 |
| 2005/0193220 A1 * | 9/2005 | Little et al. | 713/201 |
| 2006/0178995 A1 * | 8/2006 | Diehl et al. | 705/50 |
| 2006/0242465 A1 * | 10/2006 | Cruzado et al. | 714/30 |
| 2006/0242696 A1 * | 10/2006 | Cruzado et al. | 726/16 |
| 2007/0043978 A1 * | 2/2007 | Cruzado et al. | 714/38 |
| 2007/0209072 A1 * | 9/2007 | Chen | 726/16 |

FOREIGN PATENT DOCUMENTS

| | | |
|---|---|---|
| EP | 1 429 224 | 6/2004 |
| WO | WO 00/75759 | 12/2000 |

OTHER PUBLICATIONS

The International Preliminary Report on Patentability and Written Opinion of the International Searching Authority issued Jan. 14, 2009, for corresponding International Application No. PCT/US2007/15775, is provided; 13 pages.

* cited by examiner

*Primary Examiner* — Kamini Patel

(57) ABSTRACT

A system-on-chip includes first and second memories, a descrambler, and logic. The first memory stores firmware. A first portion of the firmware is scrambled and located at a predetermined address in the first memory. The second memory stores boot code for a processor. In response to the processor being booted, the boot code instructs the processor to read the first portion of the firmware from the predetermined address in the first memory. The descrambler is configured to create a descrambled value by descrambling the first portion of the firmware. The logic is configured to, in response to the descrambled value matching a predetermined authorization code, enable a test interface that allows a device external to the system-on-chip to access the processor through the test interface. The logic is further configured to, in response to the descrambled value not matching the predetermined authorization code, disable the test interface.

19 Claims, 9 Drawing Sheets

SYSTEM-ON-A-CHIP (SOC) TEST INTERFACE SECURITY

CROSS-REFERENCE TO RELATED APPLICATIONS

This application is a continuation of U.S. application Ser. No. 11/654,841, filed Jan. 18, 2007, which claims the benefit of U.S. Provisional Patent Application Ser. No. 60/831,022, filed Jul. 14, 2006, and U.S. Provisional Patent Application Ser. No. 60/820,287, filed Jul. 25, 2006. The disclosures of the above applications are incorporated herein by reference in their entirety.

BACKGROUND

The present invention relates generally to integrated circuits. More particularly, the present invention relates to system-on-a-chip (SoC) test interface security.

Recent advances in integrated circuit technology have led to the proliferation of so-called system-on-a-chip (SoC) integrated circuits, where a processor is embedded with memory and other hardware blocks such as application-specific circuits on a single integrated circuit chip. FIG. 1 shows a prior art SoC 100 comprising a processor 102, a non-volatile memory 104, a volatile memory 106, a read-only memory (ROM) 108, a test interface 110, and application-specific circuit 112.

SoC 100 usually comprises a test interface 110, such as a Joint Test Action Group (JTAG) interface, for use in debugging and testing the SoC 100. Test interface 110 is generally connected to processor 102 and application-specific circuit 112, and can be connected to other circuits in SoC 100 as well. For example, test interface 100 can be used to trace the execution by processor 102 of firmware stored in non-volatile memory 104.

However, while useful during development, test interface 110 also provides a opening for attackers to penetrate SoC 100 once deployed in the field. For example, an attacker can use test interface 110 to copy or modify the firmware to break the security of systems in which SoC 100 is deployed. SoC 100 may employ secrets such as secret keys to prevent unauthorized access to certain resources. For example, a SoC 100 deployed in a Digital Video Disc (DVD) player/burner can employ a secret key to prevent a user from making copies of a copy-protected DVD. An attacker can use test interface 110 to obtain the secret key, and then use the DVD player/burner to make copies of copy-protected DVDs.

SUMMARY

In general, in one aspect, the invention features an apparatus comprising: a processor; a test interface that is in communication with the processor only when the test interface is enabled; a first memory to store firmware for the processor; and a second memory to store boot code for the processor, wherein when the processor is booted, the boot code causes the processor to read a portion of the firmware from a predetermined location in the first memory; wherein the test interface is enabled only when the portion of the firmware has a predetermined value.

In some embodiments, the test interface comprises: a Joint Test Action Group (JTAG) interface. In some embodiments, the processor determines whether the portion of the firmware has the predetermined value; and the processor enables the test interface when the portion of the firmware has the predetermined value. Some embodiments comprise an application-specific circuit comprising a register, wherein the boot code causes the processor to write the portion of the firmware to the register, a third memory to store the predetermined value, and logic to enable the test interface based on a comparison between the register and the third memory. In some embodiments, the test interface is in communication with the application-specific circuit only when the test interface is enabled. In some embodiments, the portion of the firmware stored at the predetermined location in the first memory is scrambled, the apparatus further comprising: a descrambler to descramble the portion of the firmware when the processor reads the portion of the firmware from the predetermined location in the first memory. In some embodiments, the descrambling is performed according to at least one of: an Advanced Encryption Standard (AES) process; a Data Encryption Standard (DES) process; and a shared-key process. In some embodiments, the first memory comprises: a firmware memory. In some embodiments, the second memory comprises: a read-only memory. Some embodiments comprise an integrated circuit comprising the apparatus. Some embodiments comprise a disc player comprising the integrated circuit.

In general, in one aspect, the invention features an apparatus comprising: means for processing; test interface means for communicating with the means for processing only when the test interface means is enabled; first memory means for storing firmware for the means for processing; and second memory means for storing boot code for the means for processing, wherein when the means for processing is booted, the boot code causes the means for processing to read a portion of the firmware from a predetermined location in the first memory means; wherein the test interface means is enabled only when the portion of the firmware has a predetermined value.

In some embodiments, the test interface comprises: a Joint Test Action Group (JTAG) interface. In some embodiments, the means for processing determines whether the portion of the firmware has the predetermined value; and wherein the means for processing enables the test interface means when the portion of the firmware has the predetermined value. Some embodiments comprise third memory means for storing data, wherein the boot code causes the means for processing to write the portion of the firmware to the third memory means, fourth memory means for storing the predetermined value, and logic means for enabling the test interface based on a comparison between the third and fourth memory means. In some embodiments, the test interface means is in communication with the logic means only when the test interface is enabled. In some embodiments, the portion of the firmware stored at the predetermined location in the first memory means is scrambled, the apparatus further comprising: descrambler means for descrambling the portion of the firmware when the means for processing reads the portion of the firmware from the predetermined location in the first memory means. In some embodiments, the descrambling is performed according to at least one of: an Advanced Encryption Standard (AES) process; a Data Encryption Standard (DES) process; and a shared-key process. Some embodiments comprise an integrated circuit comprising the apparatus. Some embodiments comprise a disc player comprising the integrated circuit.

In general, in one aspect, the invention features a method for operating an apparatus including a processor, a test interface, a first memory to store firmware for the processor, and a second memory to store boot code for the processor, the method comprising: reading a portion of the firmware from a predetermined location in the first memory in response to the boot code when the processor is booted; determining whether the portion of the firmware has a predetermined value; and enabling the test interface only when the portion of the firmware has the predetermined value; wherein the test interface communicates with the processor only when the test interface is enabled.

In some embodiments, the apparatus further includes a register and a third memory to store the predetermined value, the method further comprising: writing the portion of the firmware to the register in response to the boot code; and enabling the test interface based on a comparison between the register and the third memory. In some embodiments, the apparatus further includes an application-specific circuit comprising the register and the third memory; and wherein the test interface communicates with the application-specific circuit only when the test interface is enabled. In some embodiments, the portion of the firmware stored at the predetermined location in the first memory is scrambled, the method further comprising: descrambling the portion of the firmware when reading the portion of the firmware from the predetermined location in the first memory. In some embodiments, the descrambling is performed according to at least one of: an Advanced Encryption Standard (AES) process; a Data Encryption Standard (DES) process; and a shared-key process.

In general, in one aspect, the invention features a computer program executable on a processor for operating an apparatus including a processor, a test interface, a first memory to store firmware for the processor, and a second memory to store boot code for the processor, the computer program comprising: instructions for reading a portion of the firmware from a predetermined location in the first memory in response to the boot code when the processor is booted; instructions for determining whether the portion of the firmware has a predetermined value; and instructions for enabling the test interface only when the portion of the firmware has the predetermined value; wherein the test interface communicates with the processor only when the test interface is enabled. In some embodiments, the apparatus further includes a register and a third memory to store the predetermined value, the computer program further comprising: instructions for writing the portion of the firmware to the register in response to the boot code; and instructions for enabling the test interface based on a comparison between the register and the third memory. In some embodiments, the apparatus further includes an application-specific circuit comprising the register and the third memory; and wherein the test interface communicates with the application-specific circuit only when the test interface is enabled. In some embodiments, the portion of the firmware stored at the predetermined location in the first memory is scrambled, the computer program further comprising: instructions for descrambling the portion of the firmware when reading the portion of the firmware from the predetermined location in the first memory. In some embodiments, the descrambling is performed according to at least one of: an Advanced Encryption Standard (AES) process; a Data Encryption Standard (DES) process; and a shared-key process.

The details of one or more implementations are set forth in the accompanying drawings and the description below. Other features will be apparent from the description and drawings, and from the claims.

DETAILED DESCRIPTION

Figure 1:
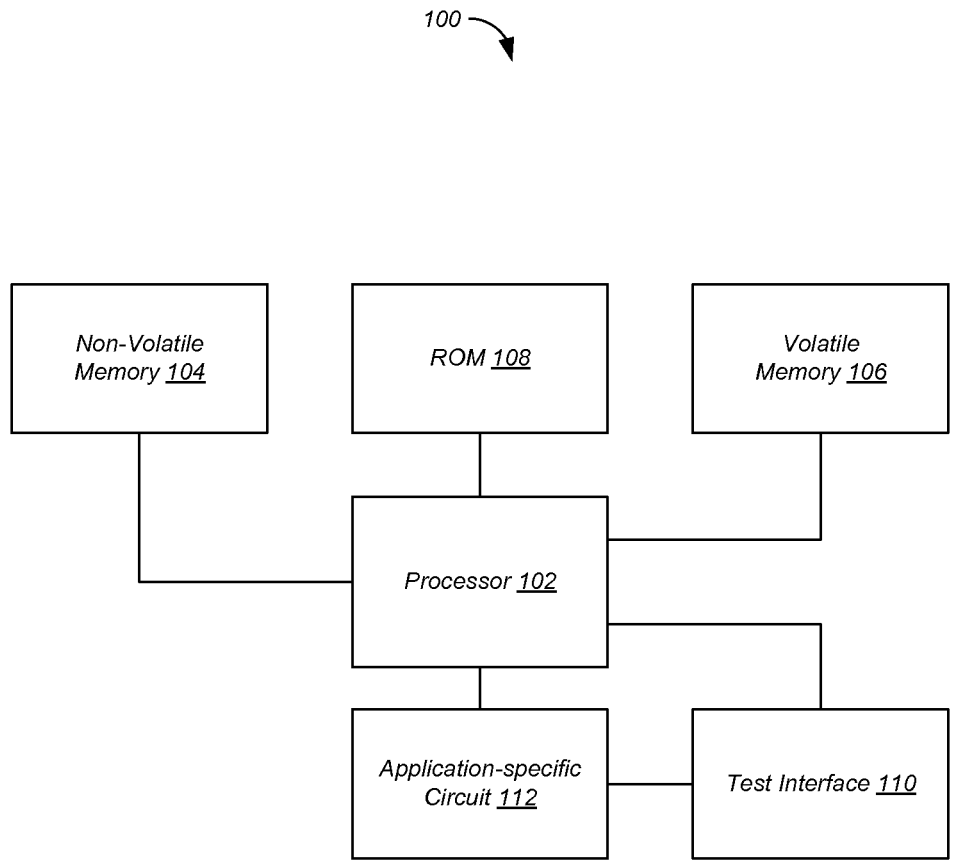
FIG. 1 shows a prior art system-on-a-chip (SoC).

Embodiments of the present invention provide security for test interfaces for system-on-a-chip (SoC) integrated circuits. The SoC includes the test interface, a processor, a firmware memory to store firmware for the processor, and a read-only memory to store boot code for the processor. The test interface is in communication with the processor only when the test interface is enabled, and can be implemented as a Joint Test Action Group (JTAG) interface. When the processor is booted, the boot code causes the processor to read a portion of the firmware from a predetermined location in the firmware memory. The test interface is enabled only when the portion of the firmware read by the processor comprises a predetermined authorization code.

In SoCs implemented according to embodiments of the present invention, the authorization code can be stored in the firmware memory during the development phase of the SoC, thereby enabling the test interface for debugging and testing of the SoC. Then, for production, the authorization code can be removed from the firmware, thereby disabling the test interface.

In some embodiments, the processor determines whether the portion of the firmware comprises the authorization code, and enables the test interface when the portion of the firmware comprises the authorization code. In other embodiments, an application-specific circuit determines whether the portion of the firmware comprises the authorization code. The application-specific circuit can be a device controller or the like, for example to control a Digital Video Disc (DVD) player/burner or the like. The application-specific circuit comprises a register, a memory to store the authorization code, and a comparator. The boot code causes the processor to write the portion of the firmware to the register. The comparator enables the test interface based on a comparison between the register and the further memory.

In embodiments where the application-specific circuit checks for the authorization code, the manufacturer of the SoC doesn't need to know the authorization code, and so is freed from the responsibility of maintaining and securing the authorization codes for the SoCs it manufactures. In these embodiments, the customer (for example, a manufacturer of an electronic device that includes the SoC) can purchase SoCs not containing authorization codes, and then the customer can enter the authorization codes into the SoCs to enable the test interface for testing and debugging. For example, the memory in the application-specific circuit can be implemented as a one-time programmable memory. The customer burns the authorization code into the memory, and also stores the authorization code in the firmware. When the customer is ready to ship the SoCs, the customer simply removes the authorization code from the firmware, thereby disabling the test interface.

In some embodiments, some or all of the firmware stored in the firmware memory is scrambled according to a scrambling process. These embodiments include a descrambler to descramble the firmware according to a descrambling process when the processor reads the firmware from the firmware memory. The scrambling and descrambling processes can include an Advanced Encryption Standard (AES) process, a Data Encryption Standard (DES) process, a shared-key process, and the like. In these embodiments, even if an attacker is somehow able to access the SoC through the test interface, the attacker will still be faced with the problem of descrambling the firmware.

Figure 2:
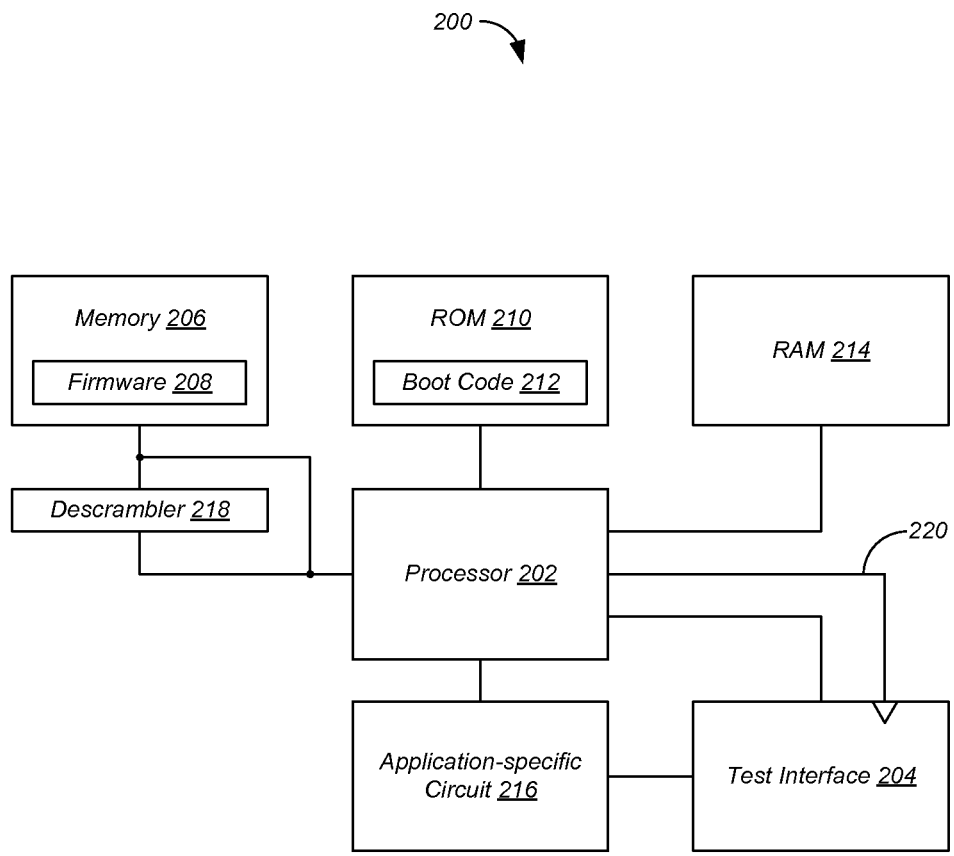
FIG. 2 shows a SoC where a processor checks for the authorization code according to some embodiments of the present invention.

FIG. 2 shows a SoC 200 where a processor 202 in SoC 200 checks for the authorization code according to embodiments of the present invention. SoC 200 comprises a processor 202, a test interface 204 that is in communication with processor 202 only when test interface 204 is enabled, a firmware memory 206 to store firmware 208 for processor 202, and a read-only memory (ROM) 210 to store boot code 212 for processor 202. Test interface 204 can be connected to processor 202 and application-specific circuit 216, as well as other circuits in SoC 200, when test interface 204 is enabled, as described in detail below. Test interface 204 can be implemented as a JTAG interface or the like. Firmware memory 206 can be implemented as a non-volatile memory or the like.

SoC 200 generally also comprises a random-access memory (RAM) 214 and an application-specific circuit 216. For example, when SoC 200 is intended to control a disc player such as a DVD player, application-specific circuit 216 can include a disc controller and a read channel. Of course, other implementations can include other sorts of application-specific circuits.

In some embodiments, firmware 208 is scrambled and SoC 200 includes a descrambler 218 to descramble all or part of firmware 208 as firmware 208 is read from firmware memory 206, for example as described above. Although in the described embodiments, the elements of SoC 200 are presented in one arrangement, other embodiments may feature other arrangements, as will be apparent to one skilled in the relevant arts based on the disclosure and teachings provided herein. For example, the elements of SoC 200 can be implemented in hardware, software, or combinations thereof.

Figure 3:
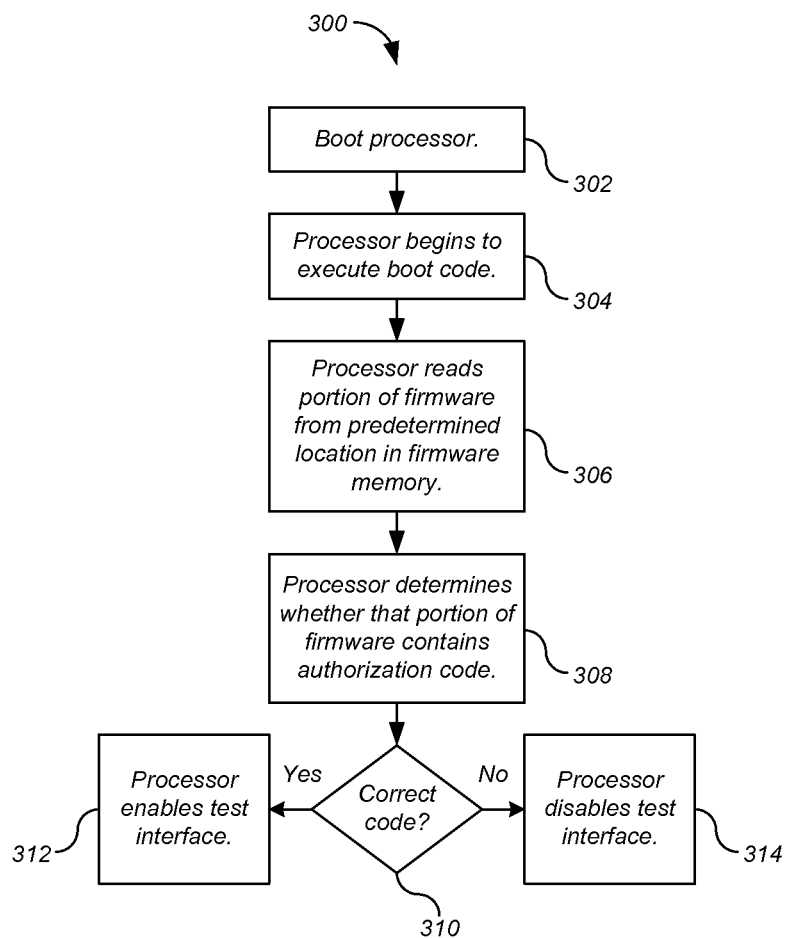
FIG. 3 shows a process for the SoC of FIG. 3 according to some embodiments of the present invention.

FIG. 3 shows a process for SoC 200 of FIG. 3 according to embodiments of the present invention. Although in the described embodiments, the elements of process 300 are presented in one arrangement, other embodiments may feature other arrangements, as will be apparent to one skilled in the relevant arts based on the disclosure and teachings provided herein.

Processor 202 is booted (step 302), for example by cycling power to SoC 200, applying a reset signal to processor 202, or the like, as is well-known in the relevant arts. When booted, processor 202 begins to execute boot code 212 stored in ROM 210 (step 304). Boot code 212 causes processor 202 to read a portion of firmware 208 from a predetermined location in firmware memory 206 (step 306), and to determine whether that portion of firmware 208 contains an appropriate authorization code (step 308). For example, an authorization code can be stored in ROM 210, and processor 202 compares that authorization code with the portion of firmware 208 read from the predetermined location in firmware memory 206.

If firmware 208 contains an appropriate authorization code (step 310), processor 202 enables test interface 204 (step 312), for example by asserting an enable signal 220. Otherwise, processor 202 disables test interface 204 (step 314), for example by negating enable signal 220. When enabled, test interface 204 allows communications between an external device, such as a test device, and processor 202, and in some embodiments, with other circuits in SoC 200 such as application-specific circuit 216.

Figure 4:
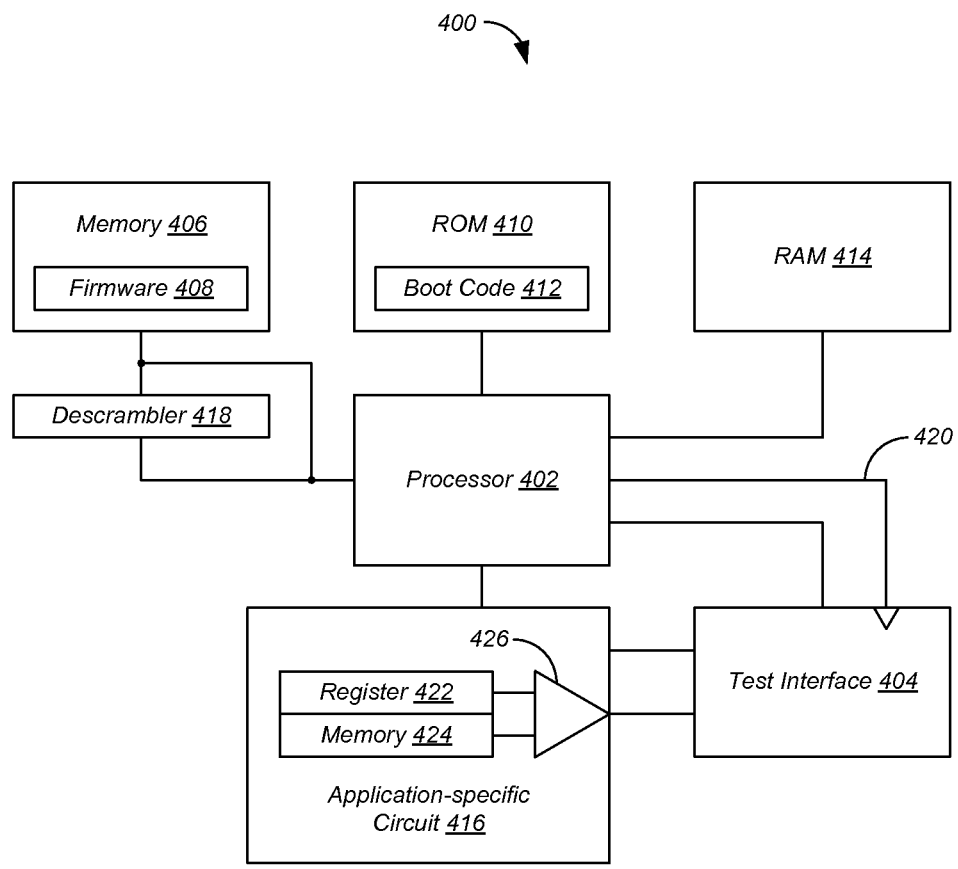
FIG. 4 shows a SoC where an application-specific circuit checks for the authorization code according to some embodiments of the present invention.

FIG. 4 shows a SoC 400 where an application-specific circuit 416 in SoC 400 checks for the authorization code according to embodiments of the present invention. SoC 400 comprises a processor 402, a test interface 404 that is in communication with processor 402 only when test interface 404 is enabled, a firmware memory 406 to store firmware 408 for processor 402, and a read-only memory (ROM) 410 to store boot code 412 for the processor. Test interface 404 can be connected to processor 402 and application-specific circuit 416, as well as other circuits in SoC 400, when test interface 404 is enabled, as described in detail below. Test interface 404 can be implemented as a JTAG interface or the like. Firmware memory 406 can be implemented as a non-volatile memory or the like. SoC 400 generally also comprises a random-access memory (RAM) 414.

SoC 400 also comprises an application-specific circuit 416. For example, when SoC 400 is intended to control a disc player such as a DVD player, application-specific circuit 416 can include a disc controller and a read channel. Of course, other implementations can include other sorts of application-specific circuits. Application-specific circuit 416 comprises a register 422, a memory 424, and a comparator 426. Memory 424 can be implemented as a one-time programmable memory.

In some embodiments, firmware 408 is scrambled and SoC 400 includes a descrambler 418 to descramble all or part of firmware 408 as firmware 408 is read from firmware memory 406, for example as described above. Although in the described embodiments, the elements of SoC 400 are presented in one arrangement, other embodiments may feature other arrangements, as will be apparent to one skilled in the relevant arts based on the disclosure and teachings provided herein. For example, the elements of SoC 400 can be implemented in hardware, software, or combinations thereof.

Figure 5:
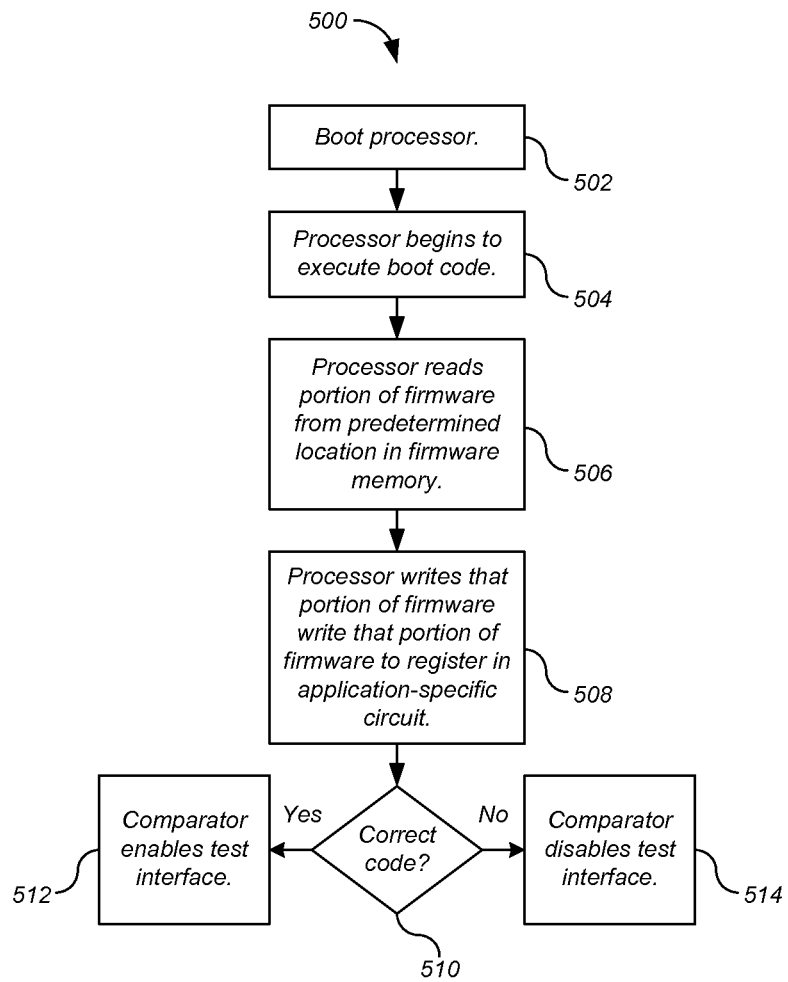
FIG. 5 shows a process for the SoC of FIG. 5 according to some embodiments of the present invention.

FIG. 5 shows a process for SoC 400 of FIG. 5 according to embodiments of the present invention. Although in the described embodiments, the elements of process 500 are presented in one arrangement, other embodiments may feature other arrangements, as will be apparent to one skilled in the relevant arts based on the disclosure and teachings provided herein.

Processor 402 is booted (step 502), for example by cycling power to SoC 400, applying a reset signal to processor 402, or the like, as is well-known in the relevant arts. When booted, processor 402 begins to execute boot code 412 stored in ROM 410 (step 504). Boot code 412 causes processor 402 to read a portion of firmware 408 from a predetermined location in firmware memory 406 (step 506), and to write that portion of firmware 408 to register 422 in application-specific circuit 416 (step 508).

In these embodiments, the authorization code is stored in memory 424. Comparator 426 enables test interface 404 based on a comparison between register 422 and memory 424. In particular, if memory 424 contains an appropriate authorization code (step 510), comparator 426 enables test interface 404 (step 512), for example by asserting an enable signal 420. Otherwise, comparator 426 disables test interface 404 (step 514), for example by negating enable signal 420. When enabled, test interface 404 allows communications between an external device, such as a test device, and processor 402, and in some embodiments, with other circuits in SoC 400 such as application-specific circuit 416.

Figure 6B:
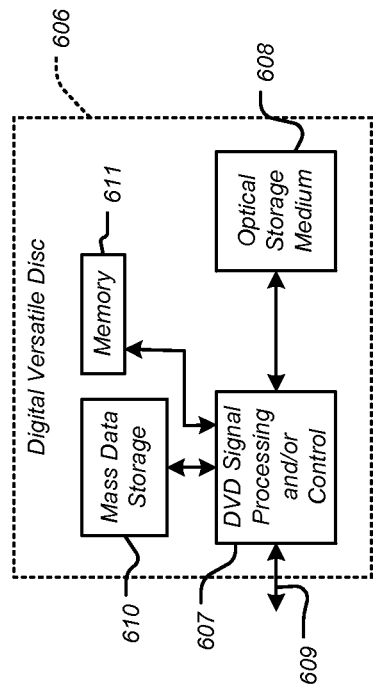
FIGS. 6A-6G show various exemplary implementations of the present invention. The leading digit(s) of each reference numeral used in this specification indicates the number of the drawing in which the reference numeral first appears.
Figure 6A:
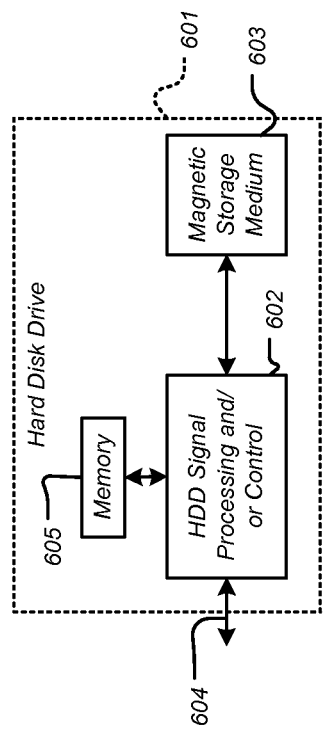

FIGS. 6A-6G show various exemplary implementations of the present invention. Referring now to FIG. 6A, the present invention can be implemented in a hard disk drive 601. The present invention may implement either or both signal processing and/or control circuits, which are generally identified in FIG. 6A at 602. In some implementations, the signal processing and/or control circuit 602 and/or other circuits (not shown) in the HDD 601 may process data, perform coding and/or encryption, perform calculations, and/or format data that is output to and/or received from a magnetic storage medium 603.

The HDD 601 may communicate with a host device (not shown) such as a computer, mobile computing devices such as personal digital assistants, cellular phones, media or MP3 players and the like, and/or other devices via one or more wired or wireless communication links 604. The HDD 601 may be connected to memory 605 such as random access memory (RAM), low latency nonvolatile memory such as flash memory, read only memory (ROM) and/or other suitable electronic data storage.

Referring now to FIG. 6B, the present invention can be implemented in a digital versatile disc (DVD) drive 606. The present invention may implement either or both signal processing and/or control circuits, which are generally identified in FIG. 6B at 607, and/or mass data storage of the DVD drive 606. The signal processing and/or control circuit 607 and/or other circuits (not shown) in the DVD 606 may process data, perform coding and/or encryption, perform calculations, and/or format data that is read from and/or data written to an optical storage medium 608. In some implementations, the signal processing and/or control circuit 607 and/or other circuits (not shown) in the DVD 606 can also perform other functions such as encoding and/or decoding and/or any other signal processing functions associated with a DVD drive.

The DVD drive 606 may communicate with an output device (not shown) such as a computer, television or other device via one or more wired or wireless communication links 609. The DVD 606 may communicate with mass data storage 610 that stores data in a nonvolatile manner. The mass data storage 610 may include a hard disk drive (HDD). The HDD may have the configuration shown in FIG. 6A. The HDD may be a mini HDD that includes one or more platters having a diameter that is smaller than approximately 1.8". The DVD 606 may be connected to memory 611 such as RAM, ROM, low latency nonvolatile memory such as flash memory and/or other suitable electronic data storage.

Figures 6C, 6D:
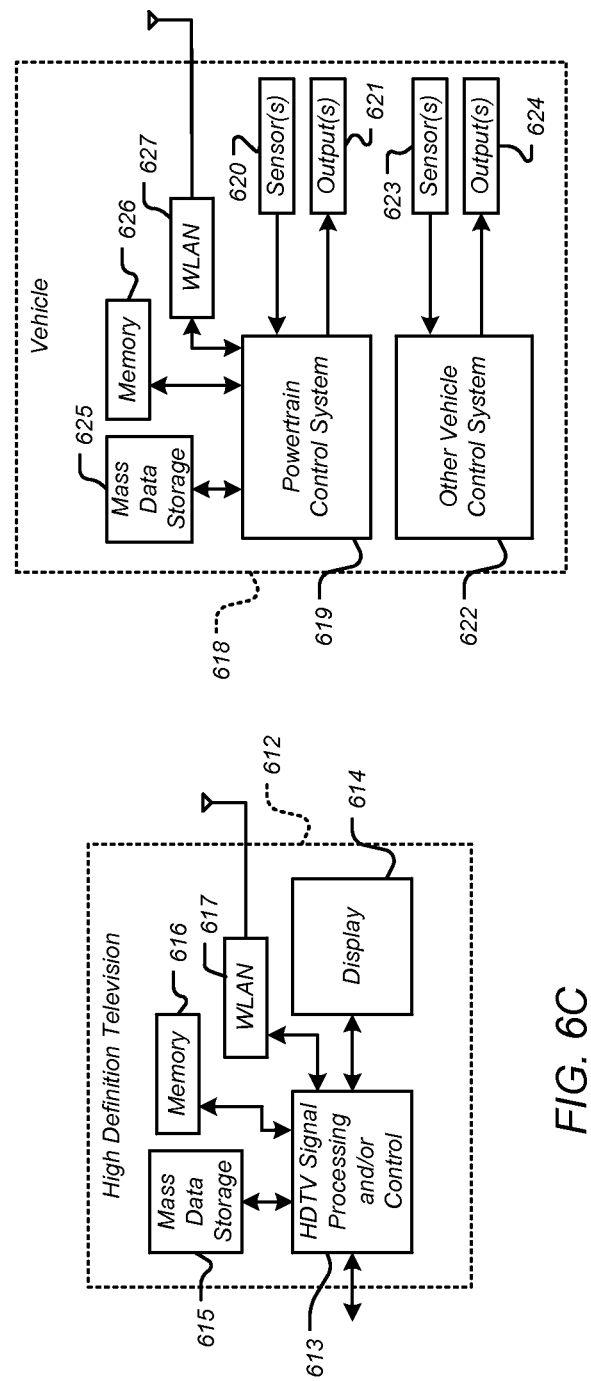

Referring now to FIG. 6C, the present invention can be implemented in a high definition television (HDTV) 612. The present invention may implement either or both signal processing and/or control circuits, which are generally identified in FIG. 6C at 613, a WLAN interface and/or mass data storage of the HDTV 612. The HDTV 612 receives HDTV input signals in either a wired or wireless format and generates HDTV output signals for a display 614. In some implementations, signal processing circuit and/or control circuit 613 and/or other circuits (not shown) of the HDTV 612 may process data, perform coding and/or encryption, perform calculations, format data and/or perform any other type of HDTV processing that may be required.

The HDTV 612 may communicate with mass data storage 615 that stores data in a nonvolatile manner such as optical and/or magnetic storage devices. At least one HDD may have the configuration shown in FIG. 6A and/or at least one DVD may have the configuration shown in FIG. 6B. The HDD may be a mini HDD that includes one or more platters having a diameter that is smaller than approximately 1.8". The HDTV 612 may be connected to memory 616 such as RAM, ROM, low latency nonvolatile memory such as flash memory and/or other suitable electronic data storage. The HDTV 612 also may support connections with a WLAN via a WLAN network interface 617.

Referring now to FIG. 6D, the present invention implements a control system of a vehicle 618, a WLAN interface and/or mass data storage of the vehicle control system. In some implementations, the present invention implements a powertrain control system 619 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be implemented in other control systems 622 of the vehicle 618. The control system 622 may likewise receive signals from input sensors 623 and/or output control signals to one or more output devices 624. In some implementations, the control system 622 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 619 may communicate with mass data storage 625 that stores data in a nonvolatile manner. The mass data storage 625 may include optical and/or magnetic storage devices for example hard disk drives (HDDs) and/or DVD drives. At least one HDD may have the configuration shown in FIG. 6A and/or at least one DVD may have the configuration shown in FIG. 6B. The HDD may be a mini HDD that includes one or more platters having a diameter that is smaller than approximately 1.8". The powertrain control system 619 may be connected to memory 626 such as RAM, ROM, low latency nonvolatile memory such as flash memory and/or other suitable electronic data storage. The powertrain control system 619 also may support connections with a WLAN via a WLAN network interface 627. The control system 622 may also include mass data storage, memory and/or a WLAN interface (all not shown).

Figure 6E:
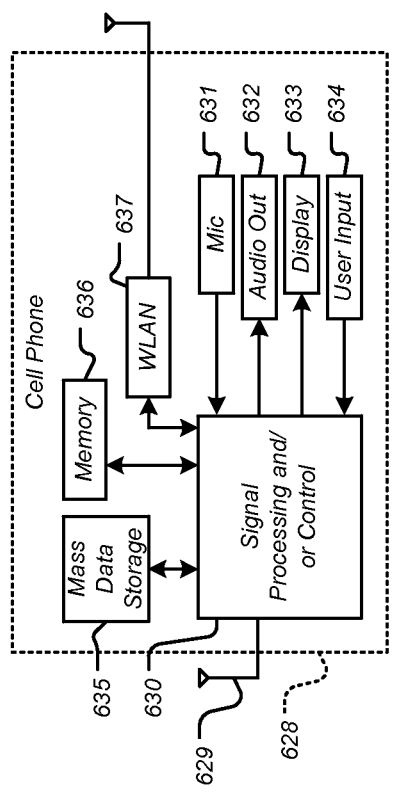

Referring now to FIG. 6E, the present invention can be implemented in a cellular phone 628 that may include a cellular antenna 629. The present invention may implement either or both signal processing and/or control circuits, which are generally identified in FIG. 6E at 630, a WLAN interface and/or mass data storage of the cellular phone 628. In some implementations, the cellular phone 628 includes a microphone 631, an audio output 632 such as a speaker and/or audio output jack, a display 633 and/or an input device 634 such as a keypad, pointing device, voice actuation and/or other input device. The signal processing and/or control circuits 630 and/or other circuits (not shown) in the cellular phone 628 may process data, perform coding and/or encryption, perform calculations, format data and/or perform other cellular phone functions.

The cellular phone 628 may communicate with mass data storage 635 that stores data in a nonvolatile manner such as optical and/or magnetic storage devices for example hard disk drives (HDD) and/or DVD drives. At least one HDD may have the configuration shown in FIG. 6A and/or at least one DVD may have the configuration shown in FIG. 6B. The HDD may be a mini HDD that includes one or more platters having a diameter that is smaller than approximately 1.8". The cellular phone 628 may be connected to memory 636 such as RAM, ROM, low latency nonvolatile memory such as flash memory and/or other suitable electronic data storage. The cellular phone 628 also may support connections with a WLAN via a WLAN network interface 637.

Figure 6F:
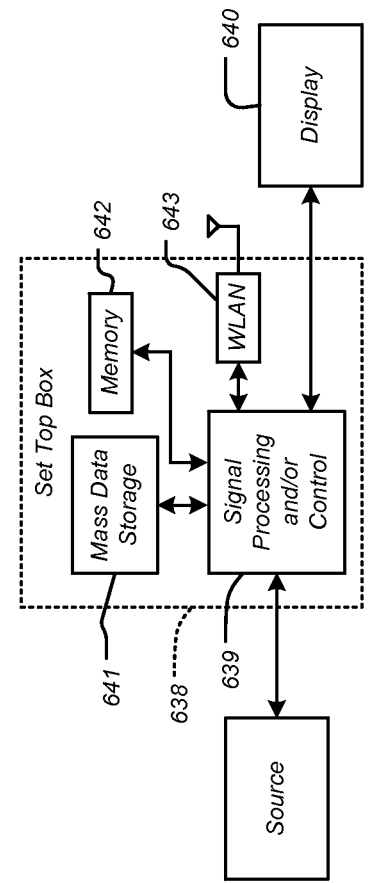

Referring now to FIG. 6F, the present invention can be implemented in a set top box 638. The present invention may implement either or both signal processing and/or control circuits, which are generally identified in FIG. 6F at 639, a WLAN interface and/or mass data storage of the set top box 638. The set top box 638 receives signals from a source such as a broadband source and outputs standard and/or high definition audio/video signals suitable for a display 640 such as a television and/or monitor and/or other video and/or audio output devices. The signal processing and/or control circuits 639 and/or other circuits (not shown) of the set top box 638 may process data, perform coding and/or encryption, perform calculations, format data and/or perform any other set top box function.

The set top box 638 may communicate with mass data storage 643 that stores data in a nonvolatile manner. The mass data storage 643 may include optical and/or magnetic storage devices for example hard disk drives (HDDs) and/or DVD drives. At least one HDD may have the configuration shown in FIG. 6A and/or at least one DVD may have the configuration shown in FIG. 6B. The HDD may be a mini HDD that includes one or more platters having a diameter that is smaller than approximately 1.8". The set top box 638 may be connected to memory 642 such as RAM, ROM, low latency nonvolatile memory such as flash memory and/or other suitable electronic data storage. The set top box 638 also may support connections with a WLAN via a WLAN network interface 643.

Figure 6G:
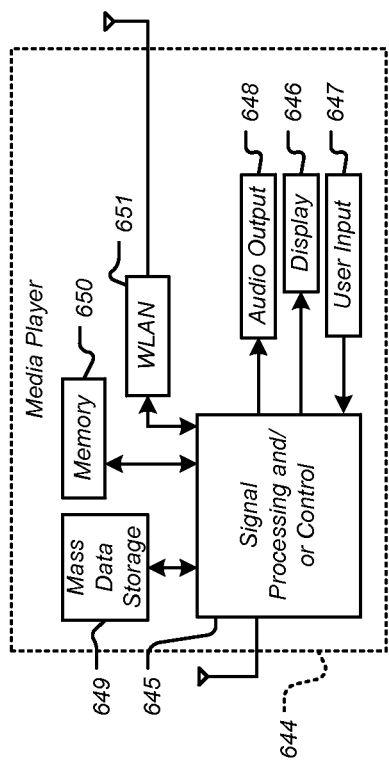

Referring now to FIG. 6G, the present invention can be implemented in a media player 644. The present invention may implement either or both signal processing and/or control circuits, which are generally identified in FIG. 6G at 645, a WLAN interface and/or mass data storage of the media player 644. In some implementations, the media player 644 includes a display 646 and/or a user input 647 such as a keypad, touchpad and the like. In some implementations, the media player 644 may employ a graphical user interface (GUI) that typically employs menus, drop down menus, icons and/or a point-and-click interface via the display 646 and/or user input 647. The media player 644 further includes an audio output 648 such as a speaker and/or audio output jack. The signal processing and/or control circuits 645 and/or other circuits (not shown) of the media player 644 may process data, perform coding and/or encryption, perform calculations, format data and/or perform any other media player function.

The media player 644 may communicate with mass data storage 649 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives (HDDs) and/or DVD drives. At least one HDD may have the configuration shown in FIG. 6A and/or at least one DVD may have the configuration shown in FIG. 6B. The HDD may be a mini HDD that includes one or more platters having a diameter that is smaller than approximately 1.8". The media player 644 may be connected to memory 650 such as RAM, ROM, low latency nonvolatile memory such as flash memory and/or other suitable electronic data storage. The media player 644 also may support connections with a WLAN via a WLAN network interface 651. Still other implementations in addition to those described above are contemplated.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A system-on-chip comprising:
   a first memory configured to store firmware, wherein a first portion of the firmware is located at a predetermined address in the first memory, and wherein the first portion of the firmware is scrambled;
   a second memory configured to store boot code for a processor, wherein in response to the processor being booted, the boot code instructs the processor to read the first portion of the firmware from the predetermined address in the first memory;
   a descrambler configured to create a descrambled value by descrambling the first portion of the firmware; and
   logic configured to
     in response to the descrambled value matching a predetermined authorization code, enable a test interface that allows a device external to the system-on-chip to access the processor through the test interface, and
     in response to the descrambled value not matching the predetermined authorization code, disable the test interface.

2. The system-on-chip of claim 1, further comprising the test interface, wherein the test interface is a Joint Test Action Group (JTAG) interface.

3. The system-on-chip of claim 1, further comprising the processor.

4. The system-on-chip of claim 3, wherein the processor includes the logic.

5. The system-on-chip of claim 1, wherein the firmware includes scrambled instructions, and wherein the descrambler is configured to descramble the scrambled instructions i) subsequent to the scrambled instructions being read from the first memory and ii) prior to execution by the processor.

6. The system-on-chip of claim 1, further comprising a register, wherein the boot code causes the processor to write the first portion of the firmware to the register, and wherein the descrambler is configured to read the first portion of the firmware from the register.

7. The system-on-chip of claim 1, further comprising a third memory configured to store the predetermined authorization code, wherein the logic is configured to read the predetermined authorization code from the third memory.

8. The system-on-chip of claim 1, wherein the second memory is a read-only memory.

9. The system-on-chip of claim 1, wherein the logic includes a comparator.

10. A disc player comprising the system-on-chip of claim 1.

11. A method of operating a system-on-chip, the method comprising:
  storing firmware in a first memory, wherein a first portion of the firmware is located at a predetermined address in the first memory, and wherein the first portion of the firmware is scrambled;
  storing, in a second memory, boot code for a processor;
  in response to the processor being booted, executing the boot code including reading the first portion of the firmware from the predetermined address in the first memory;
  creating a descrambled value by descrambling the first portion of the firmware;
  comparing the descrambled value to a predetermined authorization code;
  in response to the descrambled value matching the predetermined authorization code, enabling a test interface to permit a device external to the system-on-chip to access the processor through the test interface; and
  in response to the descrambled value not matching the predetermined authorization code, disabling the test interface.

12. The method of claim 11, wherein the test interface is a Joint Test Action Group (JTAG) interface.

13. The method of claim 11, wherein:
  the firmware includes scrambled instructions, and
  the method further comprises descrambling the scrambled instructions i) subsequent to the scrambled instructions being read from the first memory and ii) prior to execution by the processor.

14. The method of claim 11, further comprising:
  writing the first portion of the firmware to a register,
  wherein creating the descrambled value includes reading the first portion of the firmware from the register.

15. The method of claim 11, further comprising:
  storing the predetermined authorization code in a third memory,
  wherein the comparing the descrambled value to the predetermined authorization code includes reading the predetermined authorization code from the third memory.

16. The method of claim 11, wherein the second memory is a read-only memory.

17. The method of claim 11, further comprising debugging the system-on-chip while the first portion is stored in the first memory.

18. The method of claim 17, further comprising removing the first portion of the firmware from the first memory prior to selling the system-on-chip to an end user.

19. The method of claim 18, wherein removing the first portion of the firmware from the first memory includes storing new firmware at the predetermined address in the first memory, wherein the new firmware is different from the first portion of the firmware.

\* \* \* \* \*